United States Patent [19]
Numoto et al.

[11] Patent Number: 6,044,660
[45] Date of Patent: Apr. 4, 2000

[54] APPARATUS HAVING REFRIGERATION CYCLE

[75] Inventors: Hironao Numoto; Kanji Haneda; Akira Fujitaka; Shigehiro Sato, all of Shiga; Yukio Watanabe, Kyoto; Yuichi Yakumaru; Yoshinori Kobayashi, both of Shiga, all of Japan

[73] Assignee: Matsushita Electric Industrial Co., Ltd., Kadoma, Japan

[21] Appl. No.: 09/258,343

[22] Filed: Feb. 26, 1999

[30] Foreign Application Priority Data

Mar. 2, 1998 [JP] Japan .................................. 10-066167

[51] Int. Cl.$^7$ .................................................. F25B 43/02
[52] U.S. Cl. ................................................................ 62/468
[58] Field of Search ....................................... 62/468, 112

[56] References Cited

U.S. PATENT DOCUMENTS 4,482,465  11/1984  Gray ........................................ 252/67
5,531,080  7/1996  Hirahara et al. ......................... 62/470
5,858,266  1/1999  Kaneko .................................... 252/68

*Primary Examiner*—Henry Bennett
*Assistant Examiner*—Malik N. Drake
*Attorney, Agent, or Firm*—Armstrong, Westerman, Hattori, McLeland & Naughton

[57] ABSTRACT

In an apparatus having a refrigeration cycle, the refrigeration cycle is formed by annularly connecting a compressor, a condenser, an expansion device and an evaporator with one another, the apparatus uses propane, isobutane or ethane as a refrigerant, and uses refrigerating machine oil having less mutual solubility with the refrigerant, and a dryer is provided in the refrigeration cycle for absorbing water. In stead of the dryer, an additive which reacts with water may be included in said refrigerating machine oil. With this arrangement, the amount of the refrigerant can be reduced, and the long term reliability of the apparatus can be obtained.

17 Claims, 2 Drawing Sheets

APPARATUS HAVING REFRIGERATION CYCLE

TECHNICAL FIELD

The present invention relates to an apparatus having a refrigeration cycle, which uses a flammable refrigerant comprising, as a main component, one of propane (R290), isobutane (R600a) and ethane (R170), or a mixture of a plurality of these components.

BACKGROUND TECHNIQUE

At present, Freon-based refrigerants that have stable properties and are easy to be handled are used as refrigerants of an apparatus having a refrigeration cycle such as a refrigerator and an air conditioner.

However, although the Freon refrigerants have stable properties and are easy to be handled, it is said that the Freon refrigerants destroy the ozone layer, and since the Freon refrigerants adversely affect the global environment, the use of the Freon refrigerants will be entirely prohibited in the future after a preparatory period of time. Among the Freon refrigerants, hydro fluorocarbon (HFC) refrigerants do not seem to destroy the ozone layer, but they have properties to facilitate the global warming. Especially in Europe where the people are concerned about environmental problems, there is a tendency to prohibit the use of this refrigerant also. That is, there is a tendency that the use of the Freon refrigerants that are artificially produced is prohibited, and natural refrigerants such as hydrocarbon are used as in the past. However, such natural refrigerants are flammable, and limited resources must be used effectively, there is a problem that the amount of usage must be controlled.

Therefore, when refrigerant such as propane or isobutane is used in the apparatus having the refrigeration cycle, in order to reduce the amount of refrigerant to be used, it is effective to use refrigerating machine oil having less mutual solubility with the refrigerant.

However, in order to reduce the mutual solubility between the refrigerant and the refrigerating machine oil, since the polarity of the refrigerant is almost nonpolar, it is effective to use refrigerating machine oil having great polarity, but there is a problem that refrigerating machine oil having great polarity is liable to absorb water, and refrigerating machine oil which absorbs water is decomposed by strong sliding movement.

Thereupon, it is an object of the present invention to prevent the decomposition of refrigerating machine oil due to absorption of water, and to reduce the amount of refrigerant used in an apparatus having a refrigeration cycle by using refrigerating machine oil having less mutual solubility with the refrigerant.

Another object of the invention is to further reduce the amount of refrigerant used in the apparatus having the refrigeration cycle by using refrigerating machine oil suitable for reducing the refrigerant.

Another object of the invention is to provide an apparatus having a refrigeration cycle capable of obtaining the long term reliability by using refrigerating machine oil which generates few sediment and which is excellent in sealing performance and lubricating performance of sliding surface.

DISCLOSURE OF THE INVENTION

In a refrigeration cycle formed by annularly connecting a compressor, a condenser, an expansion device and an evaporator with one another, the present invention relates to an apparatus having such a refrigeration cycle, which uses a refrigerant comprising, as a main component, one of propane, isobutane and ethane, or a mixture of a plurality of these components, and uses refrigerating machine oil for the compressor having less mutual solubility with the refrigerant.

Therefore, according to the present invention, it is possible to reduce the solution amount of refrigerant into the refrigerating machine oil by selecting such refrigerant and refrigerating machine oil, and to reduce the amount of refrigerant to be charged into the apparatus having the refrigeration cycle.

To achieve the above object, according to a first aspect of the present invention, there is provided an apparatus having a refrigeration cycle, where the refrigeration cycle is formed by annularly connecting a compressor, a condenser, an expansion device and an evaporator with one another, the apparatus uses a refrigerant comprising, as a main component, one of propane, isobutane and ethane, or a mixture of a plurality of these components, and uses refrigerating machine oil having less mutual solubility with the refrigerant, and a dryer is provided in the refrigeration cycle for absorbing water.

Since propane, isobutane and the like are refrigerants whose polarities are almost nonpolar, refrigerating machine oil having great polarity is preferable as refrigerating machine oil having less mutual solubility, but refrigerating machine oil having great polarity is liable to absorb water in the atmosphere, and if refrigerating machine oil which absorbs water is used as it is, the refrigerating machine oil is decomposed by strong sliding movement of the mechanical portion of the compressor, and loss of the sliding movement is increased and sufficient reliability can not be obtained. Therefore, in order to maintain the concentration of water in the refrigeration cycle at a low level, the dryer is disposed in the refrigeration cycle to absorb, fix and hold the water. With this feature, it is possible to obtain the sufficient reliability even in an apparatus having a refrigeration cycle using refrigerating machine oil having great polarity.

According to a second aspect of the invention, there is provided an apparatus having a refrigeration cycle, where the refrigeration cycle is formed by annularly connecting a compressor, a condenser, an expansion device and an evaporator with one another, the apparatus uses a refrigerant comprising, as main component, one of propane, isobutane and ethane, or a mixture of a plurality of these components, and uses refrigerating machine oil having less mutual solubility with the refrigerant, and an additive which reacts with water is included in the refrigerating machine oil.

By using an additive which reacts with water in the refrigerating machine oil, it is possible to easily maintain the concentration of water in the refrigeration cycle at low level without disposing an element such as the dryer.

According to a third aspect, in the first or second aspect, the refrigerating machine oil is carbonate compound. A base oil of such a refrigerating machine oil is liquid material having linear or annular carbon ester bond in molecular. The carbon ester bond has great polarizability, and the polarity of the compound having this carbon ester bond in its molecular is big, it is possible to suppress the mutual solubility with propane, isobutane or ethane of nonpolarity to a small level, and it is possible to reduce the refrigerant in the apparatus having the refrigeration cycle.

According to a fourth aspect, in the third aspect, the number of carbon forming carbonic acid ester bond occupies at least 10 atomic % of all the number of carbon forming the carbonate compound. By using the carbonate compound having such a structure, greater polarity can be obtained, it is possible to further suppress the mutual solubility with propane, isobutane or ethane of nonpolarity to a small level, and it is possible to further reduce the refrigerant in the refrigeration cycle of the apparatus. Further, if a bond portion including hetero atom such as ether bond, ester bond, amide bond or urea bond is included in a portion of the carbonate compound other than the carbon ester bond portion, the polarity is further increased, and the mutual solubility can be further reduced.

According to a fifth aspect, in the third aspect, the purity of the carbonate compound of the refrigerating machine oil is 99% or higher. With this feature, it is possible to suppress the sediment in the expansion device generated from the refrigerant by controlling the total amount of function group which has not yet reacted, and the sufficient long term reliability can be obtained.

According to a sixth aspect, in the first or second aspect, mutual solubility between the refrigerating machine oil and the refrigerant is 5 wt % or less at 25° C. It is preferable that the mutual solubility is 5 wt % or less in order to reduce the amount of refrigerant to be charged. It is difficult to completely suppress the refrigerating machine oil from being discharged from the compressor, and in order to again collect, to the compressor, the refrigerating machine oil which is once discharged from the compressor, it is possible to make it easy transfer the refrigerating machine oil by circulating refrigerant by giving the mutual solubility to the refrigerating machine oil in some degree, and the sufficient long term reliability can be obtained.

According to a seventh aspect, in the third aspect, the refrigerating assembling oil includes 2 wt % or less of mineral oil or hard alkylbenzene with respect to the carbonate compound. When the mechanical portion of the compressor is assembled, a certain amount of assembling oil is required. It is possible to suppress the amount of water mixed from the atmosphere to a small level by using mineral oil or hard alkylbenzene as the assembling oil at the time of assembling, but since the assembling oil and the refrigerant are mutually dissolved in certain degree, the amount of usage is limited to 2 wt % or less. If the amount of usage of the mineral oil or hard alkylbenzene is within this range, even if the assembling oil is used together with the refrigerating machine oil having less mutual solubility with the refrigerant, the long term reliability can be ensured.

According to an eighth aspect, in the first or second aspect, kinematic viscosity of the refrigerating machine oil at 40° C. is in a range of 5 to 20 cSt. With this feature, even if the refrigerating machine oil having less mutual solubility with the refrigerant is used, the lubricating performance and the sealing performance in the sliding portion of the compressor are not deteriorated, and the long term reliability can be ensured.

According to a ninth aspect, in the first or second aspect, kinematic viscosity of the refrigerating machine oil at 100° C. is in a range of 2 to 5 cSt. With this feature, even if the refrigerating machine oil having less mutual solubility with the refrigerant is used, the lubricating performance and the sealing performance in the sliding portion of the compressor are not deteriorated, and the long term reliability can be ensured.

According to a tenth aspect, in the first or second aspect, dielectric constant of the refrigerating machine oil is 30 or higher. With this feature, it is possible to suppress the mutual solubility between the refrigerant and the refrigerating machine oil, and the long term reliability can be ensured.

According to an eleventh aspect, in the first or second aspect, volume resistivity of the refrigerating machine oil is $10^{11}$ Ωcm or higher. With this feature, it is possible to suppress the leakage of electric current due to the refrigerating machine oil, and the long term reliability can be ensured.

According to a twelfth aspect, in the first or second aspect, the amount of water in the refrigeration cycle is 50 ppm or less. That is, the amount of water existing in the refrigeration cycle is held by the dryer, or is reacted with the additive such that the amount of water is kept 50 ppm or less. With this feature, it is possible to limit the water in the refrigeration cycle to the low concentration, to prevent the deterioration of refrigerating machine oil due to the decomposition, and to further ensure the long term reliability of the apparatus having the refrigeration cycle.

According to a thirteenth aspect, in the first or second aspect, the amount of oxygen in the refrigeration cycle is 800 ppm or less. With this feature, it is possible to ensure the safety of the flammable refrigerant, to prevent the deterioration of the refrigerating machine oil due to oxidation, and to further ensure the long term reliability of the apparatus having the refrigeration cycle.

According to a fourteenth aspect, in the first aspect, the dryer is provided in a liquid side pipe from the condenser to the evaporator. With this feature, it is possible to remove water more positively without deteriorating the capacity of the refrigeration cycle due to the increase of pressure loss, and to further ensure the long term reliability of the apparatus having the refrigeration cycle.

According to a fifteenth aspect, in the first aspect, the dryer is provided in an oil reservoir in the compressor. With this feature, it is possible to more positively remove water in the refrigerating machine oil which is liable to receive the influence of water, and to further ensure the long term reliability of the apparatus having the refrigeration cycle.

According to a sixteenth aspect, in the first aspect, the dryer mainly comprises K-exchange A-type zeolite. With this feature, propane, isobutane or ethane which is the refrigerant should not physically enter the zeolite structure, and only water molecule is adsorbed and fixed and therefore, it is possible to ensure the high long term reliability of the apparatus having the refrigeration cycle.

According to a seventeenth aspect, in the first aspect, the dryer mainly comprises zeolite which is subjected to water repellent treatment. With this feature, it is possible to lower the reaction to high hydrophilic refrigerating machine oil. Even if the surface of zeolite has repellency, there is no problem in water absorbing capacity in a refrigeration cycle whose pressure is high in some degree.

According to an eighteenth aspect, in the seventeenth aspect, the water repellent treatment of the zeolite is silane coupling. With this feature, silica surfaces of zeolite and clay used as bonding material uniformly and strongly assume the repellency, and it is possible to further ensure the long term reliability of the apparatus having the refrigeration cycle.

BEST MODE FOR CARRYING OUT THE INVENTION

First, a structure of a refrigeration cycle and a compressor used in an embodiment of the present invention will be explained using the drawings.

Figure 1:
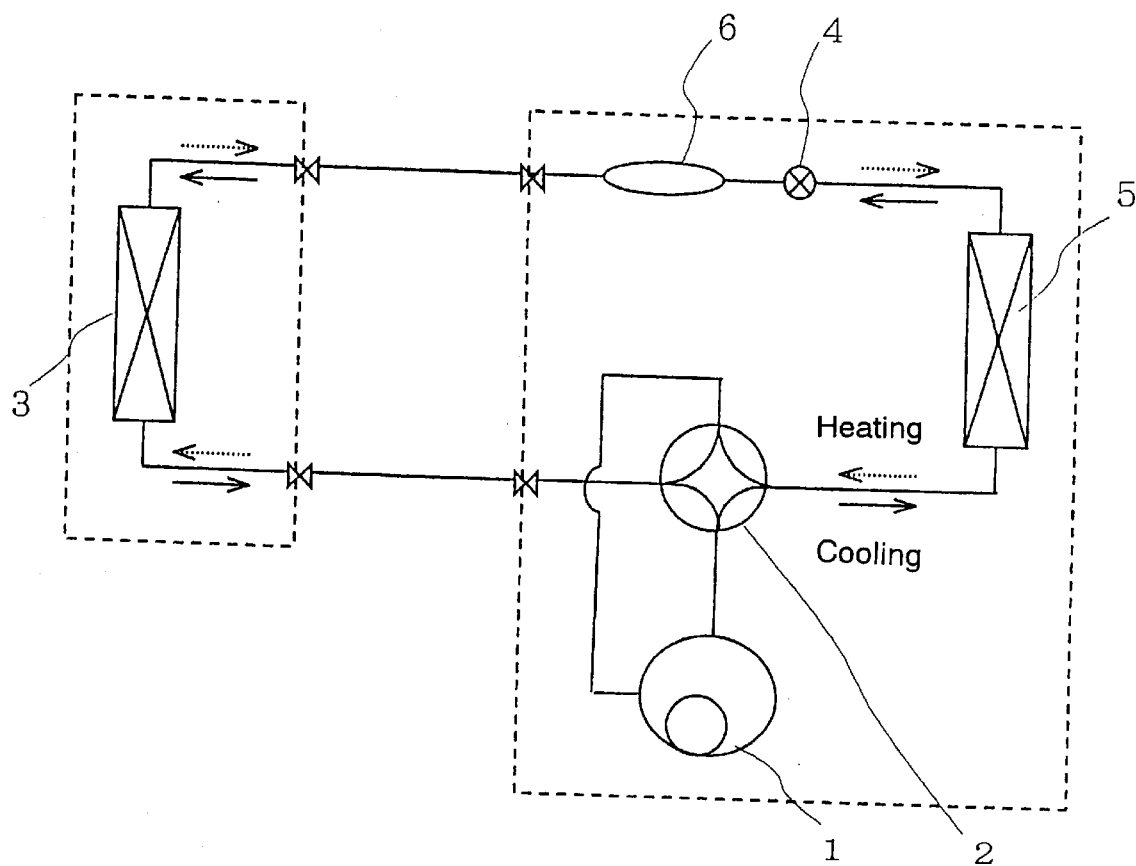
FIG. 1 is a view of a refrigeration cycle according to an embodiment of the present invention.
Figure 2:
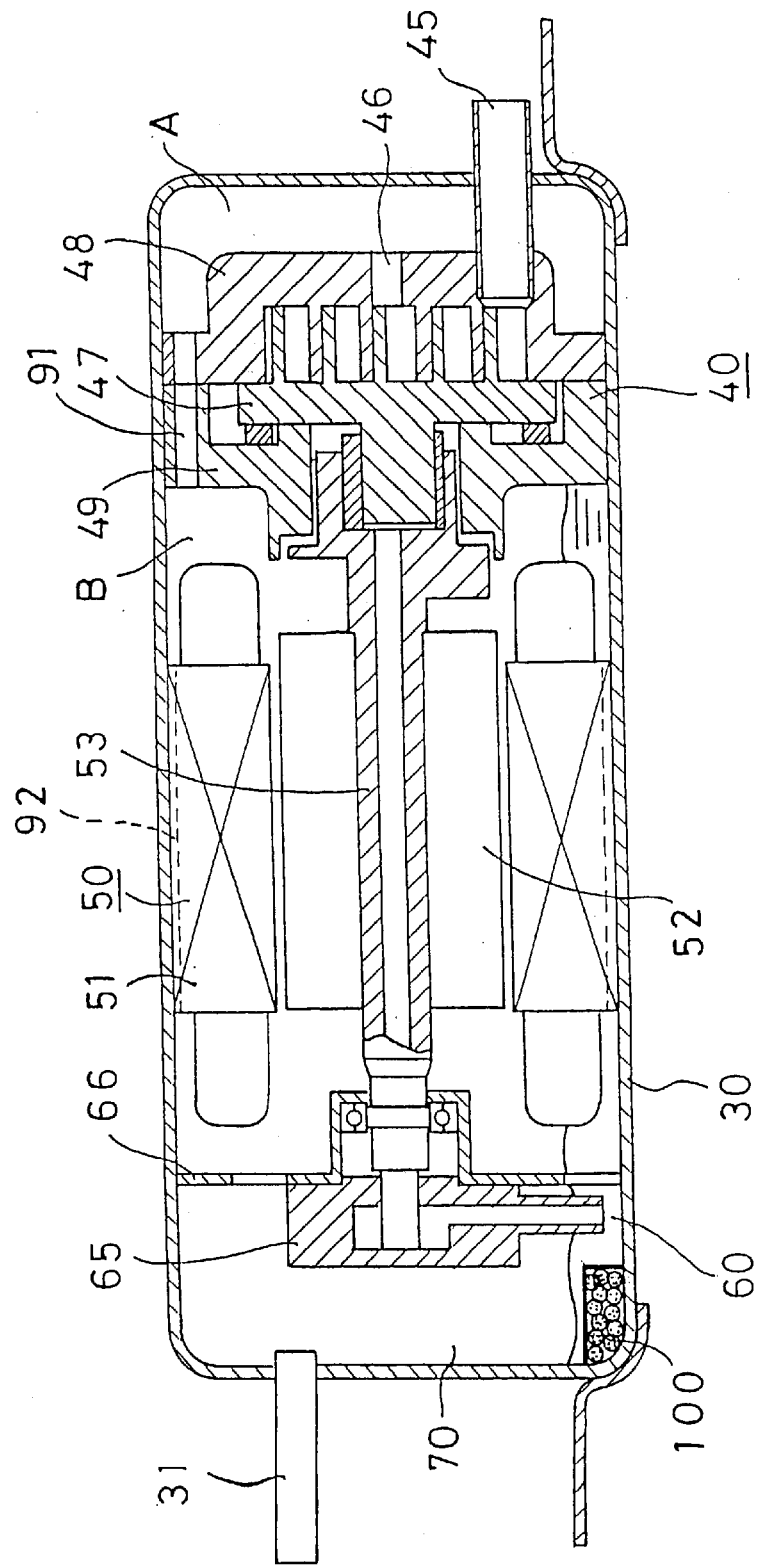
FIG. 2 is a sectional view of a compressor according to the embodiment of the invention.

FIG. 1 shows the refrigeration cycle in an air conditioner, and FIG. 2 shows a sectional view of the compressor used in the air conditioner.

As shown in FIG. 1, the compressor 1, a 4-way valve 2, an indoor heat exchanger 3, an expansion device 4 and an outdoor heat exchanger 5 are annularly connected with one another through pipes, thereby forming a refrigeration cycle. The indoor heat exchanger 3 functions as a condenser at the time of heating operation, and functions as an evaporator at the time of cooling operation. The outdoor heat exchanger 5 functions as an evaporator at the time of heating operation, and functions as a condenser at the time of cooling operation.

As shown in FIG. 1, a dryer 6 for absorbing water is provided in a liquid side pipe between the indoor heat exchanger 3 and the outdoor heat exchanger 5.

As refrigerant used in the refrigeration cycle, propane or isobutane is used. As refrigerating machine oil in the compressor 1, refrigerating machine oil having less mutual solubility with the refrigerant is used. As such refrigerating machine oil, refrigerating machine oil comprising carbonate compound is effective, and carbonate compound in which the number of carbon forming carbonic acid ester bond occupies at least 10 atomic % of all the number of carbon forming carbonate compound is more effective. It is preferable that mutual solubility between the refrigerant and the refrigerating machine oil is 5 wt % or less at 25° C. The dryer 6 includes K-exchange A-type zeolite as main material which is calcined using clay of 25 wt % as bonding material. At that time, it is preferable that the zeolite is subjected to water repellent treatment by silane coupling.

In such a refrigeration cycle, at the time of heating operation, the heat of the refrigerant which is compressed by the compressor 1 is released in the indoor heat exchanger 3, and the refrigerant is decompressed by the expansion device 4, and absorbs heat in the outdoor heat exchanger 5, and is sucked into the compressor 1.

At the time of cooling operation, the refrigerant compressed by the compressor 1 flows through the outdoor heat exchanger 5, the expansion device 4 and the indoor heat exchanger 3 in this order, and is sucked into the compressor 1.

Water included in the refrigeration cycle circulates through the refrigeration cycle together with the refrigerant, and is absorbed by the dryer 6 when the water passes through the dryer 6. By providing the dryer 6 in the liquid side pipe as shown in FIG. 1, the reducing amount by the expansion device 4 can be a value in which a pressure loss generated in the dryer 6 is taken into account, and the capacity of the refrigeration cycle can be kept appropriately.

FIG. 2 is a sectional view of the compressor 1 used in the present embodiment.

The compressor 1 shown in FIG. 2 is a horizontal high pressure type scroll compressor in which a compressor mechanism 40, a motor mechanism 50 and a pump 65 are laterally provided in a cylindrical shell 30. The compressor mechanism 40 comprises two scroll laps 47, 48, an oldham ring 49 and the like. A refrigerant communication hole 91 is formed in the compressor mechanism 40 for bringing a space A at the side of a discharge port 46 of the compressor mechanism 40 and a space B at the side of the motor mechanism 50 thereof into communication with each other.

The motor mechanism 50 comprises a stator 51, a rotor 52 and the like. A gap 92 through which refrigerant gas passes through is formed between the stator 51 of the motor mechanism 50 and the shell 30. The rotor 52 and the scroll lap 47 are connected to each other through a crankshaft 53.

An oil reservoir 60 is provided in a lower portion of the shell 30 at a portion closer to the motor mechanism 50 than the compressor mechanism 40. The oil reservoir 60 is provided such that a dryer 100 is soaked in refrigerating machine oil. The dryer 100 includes K-exchange A-type zeolite as main material which is calcined using clay of 25 wt % as bonding material. The dryer 100 may be disposed at any place if the dryer 100 can be soaked in the refrigerating machine oil sufficiently. In this regard, if the dryer 100 is disposed in the vicinity of an intake port of the pump 65 as shown in FIG. 2, refrigerating machine oil after water is removed can effectively be supplied. However, since the dryer 100 is always in contact with the refrigerating machine oil under a high pressure condition, it is necessary to pay attention to decomposition of the refrigerating machine oil due to zeolite in view of long term reliability.

An oil partition 66 is provided between the motor mechanism 50 and the pump 65. A lubrication groove is formed in the crankshaft 53 and the Oldham ring 49 for supplying the refrigerating machine oil pumped up from the oil reservoir 60 by the pump 65 to the scroll laps 47 and 48. A refrigerant discharging pipe 31 is provided closer to the pump 65 than the oil partition 66.

The flow of refrigerant gas and refrigerating machine oil of the compressor will be explained below.

First, the refrigerant introduced into spaces in the scroll laps 47 and 48 from an accumulator through an intake port 45 is compressed with turning movement of the movable scroll lap 47, and the compressed high pressure refrigerant gas is discharged from the discharge port 46 into the space A. The refrigerant discharged into the space A is introduced through the refrigeration communication hole 91 into the space B between the compressor mechanism 40 and the motor mechanism 50. The refrigerant passes through a gap 92 between the stator 51 and the shell 30, and through the oil partition 66 and reaches an oil separating chamber 70, and is discharged from the refrigerant discharging pipe 31 out of the shell 30.

Water included in the refrigerating machine oil accumulated in the oil reservoir 60 is removed by the dryer 100 and then, the refrigerating machine oil is pumped up by the pump 65, and is supplied to sliding surfaces of the scroll laps 47, 48 and the Oldham ring 49 through the lubrication groove formed in the crankshaft 53, the Oldham ring 49 and the like. The refrigerating machine oil supplied into the compressor chamber is discharged into the space A from the discharge port 46 together with the refrigerant, and is moved in the same manner as the refrigerant gas. However, the refrigerating machine oil discharged out together with the refrigerant is separated from the refrigerant when the refrigerating machine oil passes through the motor mechanism 50. The refrigerating machine oil passing through the motor mechanism 50 together with the refrigerant gas is separated from the refrigerant in the oil separating chamber 70. The refrigerating machine oil separated in this manner from the refrigerant is dropped to the oil reservoir 60. Most of refrigerating machine oil is introduced toward the pump 65 by the stream of the refrigerant, but since the oil partition 66 is provided, most refrigeranting machine oil is accumulated in the oil reservoir 60 in the oil separating chamber 70.

Although it is described that the dryer 6 is provided in the refrigeration cycle, and the dryer 100 is provided in the compressor 1, the dryer may be provided either one of them.

(First Embodiment)

In the refrigeration cycle of the apparatus shown in FIG. 1, 250 g of propane was used as refrigerant, and 250 g of carbonate compound of 99.5% of purity represented by the following chemical formula and having ratio of 28% carbon forming carbonic acid ester bond was used as refrigerating machine oil.

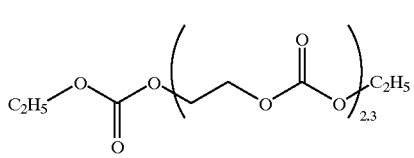

(1)

The dryer 6 was provided in the refrigeration cycle, and the dryer 100 was not provided in the compressor 1.

The following series of reliability evaluation tests were conducted with respect to the above-described apparatus having the refrigeration cycle, and no abnormality was found. An outdoor unit is disposed at a position 5 m higher than an indoor unit.

Although the refrigerating machine oil in which 1 wt % of epoxy compound (molecular weight: 306) was added was used in the present embodiment, additive that can be used in the present invention is not be limited to this. Other additive that reacts with water and becomes stable alcohol radical or the like may be used. However, epoxy compound having high reactivity also reacts with carbonate compound, water in the refrigeration cycle can not be absorbed, and sediment is produced in an expansion device in which flowing speed is reduced, which may cause a factor to reduce the flow rate. Further, if the amount of additive added to the refrigerating machine oil is not controlled in some degree, additives having inferior stability are polymerized with each other, which may cause a factor to produce sediment in the expansion device to reduce the flow rate. Therefore, the additive amount was 2 wt % or less, and more preferably, 1 wt % or less.

(Third Embodiment)

In the third embodiment, the dryer 6 was not used, and the dryer 100 in the compressor 1 was used. K-exchange A-type

|   | Contents of test | Condition | Testing time |
|---|---|---|---|
| 1 | Cooling operation at high temperature continuously | Indoor and outdoor units: 40° C. | 1,000 hr |
| 2 | Cooling operation at high temperature intermittently (ON for 26 min, off for 4 min) | Indoor and outdoor units: 40° C. | 1,000 hr |
| 3 | Heating operation at high temperature continuously | Indoor and outdoor units: 24° C. | 1,000 hr |
| 4 | Heating operation at high temperature intermittently (ON for 26 min, off for 4 min) | Indoor and outdoor units: 24° C. | 1,000 hr |
| 5 | Heating operation at low temperature continuously | Indoor unit: 24° C., outdoor unit: −3° C. | 1,000 hr |
| 6 | Heating operation at low temperature continuously (On for 1 hr, Off for 5 hr) | Indoor unit: 24° C., outdoor unit: −3° C. | 1,000 hr |
| 7 | Heating operation at low temperature continuously (* Condition 1) | Indoor unit: 24° C., outdoor unit: −3° C. | 1,000 hr |

* Condition 1: The outdoor unit is disposed at a position 5 m higher than the indoor unit.

Comparative Example 1

In the comparative example 1, 250 g of mineral oil was charged, a refrigeration cycle which was the same as that of the first embodiment was formed, and a charging amount of propane required for obtaining the same heating capacity was measured, and the result was 400 g.

Therefore, it was found that the charging amount of propane could be reduced by about 150 g, by using, as refrigerating machine oil, the carbonate compound having less mutual solubility with propane as in the first embodiment.

(Second Embodiment)

In the second embodiment, the dryer 6 shown in FIG. 1 was not used, and 1 wt % of epoxy compound which reacted with water in some degree under high temperature and high pressure was added in the same refrigerating machine oil as that of the first embodiment, and the resultant refrigerating machine oil was charged. In the present embodiment also, the dryer 100 was not provided in the compressor 1.

The same reliability evaluation tests as those of the first embodiment were conducted with respect to the apparatus having the refrigeration cycle of the second embodiment and as a result, no abnormality was found.

zeolite as main material which was calcined using clay of 25 wt % as bonding material was incorporated in the dryer 100.

Refrigerant and refrigerating machine oil were the same as those in the first embodiment.

As a result, it was possible to fix and hold water in the refrigeration cycle by zeolite faster than the first embodiment.

(Fourth Embodiment)

In the fourth embodiment, K-exchange A-type zeolite as main material was calcined using clay of 25 wt % as bonding material, and the resultant material was sufficiently subjected to coupling treatment using trimethylchlorosilane for water repellent, and was used as the dryer 6 in the first embodiment.

The same series of reliability evaluation tests as those in the first embodiment were conducted with respect to the present embodiment. As a result, the amount of non-condensed gas generated due to decomposition of the refrigerating machine oil was smaller than the first embodiment. It is considered that this result was caused because the dryer which mainly comprises zeolite was provided with repellency so that the absorption and adhesion of the refrigerating machine oil could be suppressed, it was possible to prevent zeolite from acting as a reaction place of decomposition of the refrigerating machine oil.

In the present embodiment, in order to make zeolite have repellency, silane coupling treatment was conducted, but repellent treatment that can be applied to the present invention is not limited to this. Alternatively, it is possible to treat with a Teflon-based compound. However, it is considered that the silane coupling is most preferable in view of congeniality with zeolite to be treated and retention strength of the water repellent film.

The above embodiments have been explained using the horizontal high pressure type scroll compressor as the compressor, the compressor applicable to the present invention is not limited to this, and other compressors of rotary type, helical type, linear type and the like can also be used. Since the mechanical structure of the scroll compressor used in the present embodiment is complicated, although about 4 g of hard alkylbenzene (1.6 wt % of the refrigerant) was used as assembling oil, but abnormality due to this was not detected as a result of reliability evaluation tests. If the mechanism is assembled without using this assembling oil, the members were damaged such as flaw in many cases, and the yield was largely reduced. Further, if the assembling oil was not used in cold winter season, adhesion of water was caused due to dropwise condensation more frequently as compared with a case in which the assembling oil was used. Therefore, it is considered that it is preferable to effectively use the appropriate amount of assembling oil which hardly absorbs water in the atmosphere. In the case of a linear compressor or a single rotary compressor having a simple mechanical structure, a necessary amount of assembling oil could be smaller than that of the scroll compressor, and the amount was about 1 to 2 g. It is considered that the apparatus can be produced with high productivity by controlling the amount of assembling oil to 2 wt % or less with respect to refrigerating machine oil in view of structures of various compressors.

Although carbonate compound (ratio of 28% carbon forming carbonic acid ester bond) represented by the chemical formula (1) was used as refrigerant in the above embodiments, it was found that it is preferable that the ratio of the number of carbon forming the carbonic acid ester bond is 10 atomic % or higher with respect to the total number of carbon forming carbonate compound so as to suppress the solubility with the propane, isobutane and ethane to a small value. However, if the ratio exceeds 30 atomic %, thermal stability as refrigerant is largely deteriorated, and it is considered that the optimal range is 10 to 30 atomic %.

In the above embodiments, carbonate compound of 99.5% of purity was used, and its producing method will be described below.

Methanol solution of ethylene glycol, dimethyl carbonate and sodium methoxide was charged in a predetermined container having a distillation column, and it was heated under normal pressure at 110 to 150° C. for 8 hours to distill ethanol to be generated, and the temperature was increased up to 200° C. under vacuum to distil residue diethyl carbonate. Tetrahydrofuran was charged into the obtained reaction mixture and diluted and then, the mixture was passed through a column in which ion-exchange resin amberyst 15 (trade name) to neutralize and remove residue catalyst and then, the tetrahydrofuran was distilled and removed to obtain the carbonate compound (represented by the chemical formula 1). Therefore, material having high reactivity did not remain, but it was necessary to control to restrict impurities which were not the desired carbonate compound so as to obtain long term reliability as an apparatus having a refrigeration cycle. More specifically, although yield and kinds of impurities differed depending upon the desired carbonate compound, in the case of carbonate compound applicable to the present invention, it was necessary to control the purity to 99% or more, and more preferably, 99.5% or more.

Although K-exchange A-type zeolite was used as a content of the dryer in the embodiments, zeolite that can be used in the present invention is not limited to this. Na-exchange type and Ca-exchange type zeolite could be used without any problem. In the case of Na-exchange type and Ca-exchange type zeolite, propane refrigerant entered in the structure of zeolite, but since water absorption strength of zeolite was stronger, propane refrigerant gradually substituted for water, and water was absorbed and fixed. However, it is considered that it is most preferable to select K-exchange type zeolite so as to positively absorb and fix only water (diameter of molecular: 0.28 nm) in the structure of zeolite in view of fine hole diameter of zeolite structure, The present invention uses refrigerating machine oil having less mutual solubility with refrigerant comprising, as main component, one of propane, isobutane and ethane, or a mixture of a plurality of these components. Therefore, viscosity of the refrigerant used in the present invention is very small as compared with refrigerant having high mutual solubility with refrigerant. Further, in the case of the refrigerating machine oil having the high mutual solubility, the refrigerant was melted in the refrigerating machine oil to lower the viscosity at a low temperature, and the refrigerant was discharged from the refrigerating machine oil at a high temperature, and the refrigerating machine oil having the high mutual solubility was used as hydraulic fluid in a state where the viscosity thereof is close to that of the refrigerating machine oil itself by lowering the viscosity. However, in the case of the refrigerating machine oil having less mutual solubility, since the mutual tendency between the viscosity and the temperature of the refrigerating machine oil itself directly affects the performance of the compressor, it is preferable that the viscosity dependency with respect to the temperature is as low as possible. In view of the oil seal and efficiency of the compressor, it was preferable that kinematic viscosity at 100° C. was 2 to 5 cSt, and kinematic viscosity at 40° C. was 5 to 20 cSt.

The present invention intends to use refrigerating machine oil having less mutual solubility with refrigerant comprising, as main component, one of propane, isobutane and ethane, or a mixture of a plurality of these components, and as a result of hard research therefor, it was found that it was possible to lower the mutual solubility by increasing dielectric constant of refrigerating machine oil. More specifically, it is considered that if the dielectric constant is 30 or higher, a refrigerant having, as a main component, a one of propane, isobutane and ethane, or a mixture of a plurality of these components can be included.

Since the present invention intends to use refrigerating machine oil having less mutual solubility with refrigerant comprising, as a main component, one of propane, isobutane and ethane, or a mixture of a plurality of these components, it is not possible to expect volume resistivity of $10^{13}$ Ωcm or greater unlike the conventional mineral oil. However, if measures for current leakage as an apparatus having a refrigeration cycle are taken into account, characteristic equal to or greater than $10^{11}$ Ωcm was required even if the refrigerating machine oil has great polarity.

Since the present invention intends to use refrigerating machine oil having less mutual solubility with refrigerant comprising, as a main component, one of propane, isobutane and ethane, or a mixture of a plurality of these components, refrigerating machine oil having great hygroscopicity is used. At that time, if water remains free in the refrigerating machine oil, refrigerating machine oil is easily decomposed under a high temperature condition of the sliding portion of the compressor, and this acts as a trigger to develop excessive decomposition of the refrigerating machine oil. Furthermore, the flow rate of the decomposed material was lowered around the expansion device of the refrigeration cycle, the decomposed material became sediment onto pipe wall, and the pipe might be choked. Therefore, it was necessary to control the water in the refrigeration cycle at 50 ppm or less, preferably, 30 ppm or less so as to obtain the long term reliability as an apparatus having the refrigeration cycle.

Since the present invention intends to use refrigerating machine oil having less mutual solubility with refrigerant comprising, as main component, one of propane, isobutane and ethane, or a mixture of a plurality of these components, refrigerating machine oil having great hygroscopicity is used. Such a refrigerating machine oil was inferior also in thermal resistance to conventional mineral oil and the like, if a great amount of residue oxygen exists in the refrigeration cycle, the residue oxygen was easily taken into the refrigerating machine oil under a high temperature condition of the sliding portion of the compressor, or reversely, the oxygen was combined with refrigerating machine oil decomposed material into compound. Therefore, it was necessary to control the oxygen in the refrigeration cycle at 800 ppm or less, preferably, at 500 ppm or less so as to obtain the long term reliability as an apparatus having the refrigeration cycle.

As apparent from the above-described embodiment, according to the present invention, it is possible to prevent the deterioration and the decomposition of refrigerating machine oil, to reduce the charging amount of refrigerant by using refrigerating machine oil having less mutual solubility with the refrigerant, and to provide a high safety apparatus having a refrigeration cycle.

What is claimed is:

1. An apparatus having a refrigeration cycle, where said refrigeration cycle is formed by annularly connecting a compressor, a condenser, an expansion device and an evaporator with one another, said apparatus uses a refrigerant comprising, as a main component, one of propane, isobutane and ethane, or a mixture of a plurality of these components, and uses refrigerating machine oil wherein a mutual solubility between said refrigerating machine oil and said refrigerant is 5 wt % or less at 25° C., and a dryer is provided in said refrigeration cycle for absorbing water.

2. An apparatus having a refrigeration cycle according to claim 1, wherein said refrigerating machine oil is carbonate compound.

3. An apparatus having a refrigeration cycle according to claim 2, wherein in said refrigerating machine oil, the number of carbon atoms forming a carbonic acid ester bond is at least 10 atomic % of all the number of carbon atoms forming said carbonate compound.

4. An apparatus having a refrigeration cycle according to claim 2, wherein the purity of said carbonate compound of said refrigerating machine oil is 99% or higher.

5. An apparatus having a refrigeration cycle according to claim 2, wherein said refrigerating machine oil includes 2 wt % or less of mineral oil or hard alkylbenzene with respect to said carbonate compound.

6. An apparatus having a refrigeration cycle according to claim 1 or 2, wherein kinematic viscosity of said refrigerating machine oil at 40° C. is in a range of 5 to 20 cSt.

7. An apparatus having a refrigeration cycle according to claim 1 or 2, wherein kinematic viscosity of said refrigerating machine oil at 100° C. is in a range of 2 to 5 cSt.

8. An apparatus having a refrigeration cycle according to claim 1 or 2, wherein dielectric constant of said refrigerating machine oil is 30 or higher.

9. An apparatus having a refrigeration cycle according to claim 1 or 2, wherein volume resistivity of said refrigerating machine oil is $10^{11}$ Ωcm or higher.

10. An apparatus having a refrigeration cycle according to claim 1 or 2, wherein the amount of water in said refrigeration cycle is 50 ppm or less.

11. An apparatus having a refrigeration cycle according to claim 1 or 2, wherein the amount of oxygen in said refrigeration cycle is 800 ppm or less.

12. An apparatus having a refrigeration cycle according to claim 1, wherein said dryer is provided in a liquid side pipe from said condenser to said evaporator.

13. An apparatus having a refrigeration cycle according to claim 1, wherein said dryer is provided in an oil reservoir in said compressor.

14. An apparatus having a refrigeration cycle according to claim 1, wherein said dryer mainly comprises K-exchange A-type zeolite.

15. An apparatus having a refrigeration cycle according to claim 1, wherein said dryer mainly comprises zeolite which is subjected to water repellent treatment.

16. An apparatus having a refrigeration cycle according to claim 15, wherein said water repellent treatment of said zeolite is silane coupling.

17. An apparatus having a refrigeration cycle according to claim 1, wherein said dryer is provided in a liquid side pipe from said condenser to said evaporator and/or, wherein said dryer is provided in an oil reservoir in said compressor.

* * * * *